(12) United States Patent
Sprecher

(10) Patent No.: US 6,425,038 B1
(45) Date of Patent: Jul. 23, 2002

(54) CONVERSION OF DESK-TOP OPERATING SYSTEM FOR REAL-TIME CONTROL USING INSTALLABLE INTERRUPT SERVICE ROUTINES

(75) Inventor: Reginald W. Sprecher, Milwaukee, WI (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 0 days.

(21) Appl. No.: 09/406,516

(22) Filed: Sep. 28, 1999

(51) Int. Cl.[7] .............................................. G06F 13/00
(52) U.S. Cl. ........................ 710/269; 710/261; 710/269
(58) Field of Search ................................ 710/269, 262, 710/261, 266; 709/103, 102, 107

(56) References Cited

U.S. PATENT DOCUMENTS

| | | | | |
|---|---|---|---|---|
| 5,469,571 A | * | 11/1995 | Bunnell ...................... 710/260 |
| 5,694,606 A | * | 12/1997 | Pletcher et al. ............. 710/261 |
| 5,918,056 A | * | 6/1999 | Chirstie ....................... 710/260 |
| 6,002,877 A | * | 12/1999 | Yamagata ................... 710/265 |
| 6,112,274 A | * | 8/2000 | Goe et al. ................... 710/260 |
| 6,269,419 B1 | * | 7/2001 | Matsuyama ................. 710/269 |

* cited by examiner

Primary Examiner—Peter Wong
Assistant Examiner—Raymond N Phan
(74) Attorney, Agent, or Firm—Keith M. Baxter; Alexander M. Gerasimow; William R. Walbrun

(57) ABSTRACT

Run time modification of interrupt service routines in an embedded operating system installs a soft vectored interrupt service routine into the operating system kernel at the time of the kernel generation. The soft vectored interrupt service routine refers interrupt service calls to installable interrupt service routines that may be loaded subsequently on a real-time basis. In this way, flexible interrupt service routine response may be obtained for a wide variety of hardware combinations, unanticipated at the time of the generation of the operating system kernel.

13 Claims, 3 Drawing Sheets

CONVERSION OF DESK-TOP OPERATING SYSTEM FOR REAL-TIME CONTROL USING INSTALLABLE INTERRUPT SERVICE ROUTINES

BACKGROUND OF THE INVENTION

The present invention relates to computer operating systems and in particular to a method of modifying of an embedded operating system for real-time embedded control thereby effectively creating a new computer operating system architecture.

Industrial controllers are special purpose computers used for controlling industrial processes or manufacturing equipment. Under the direction of a stored program, the industrial controller examines a set of inputs reflecting the status of the controlled process and changes a set of outputs controlling the industrial process. The inputs and outputs may be binary, that is on or off, or analog, providing a value within a continuous range. Typically analog signals are converted to binary words for processing.

An embedded operating system differs from general purpose operating system in two respects. The first is that the embedded operating system must provide a predictable, high speed response in reacting to input signals and changing output signals. Such fast and predictable responses are obtained by using hardware interrupts. Hardware interrupts make use of one or more physical lines communicating directly with a processor. A signal on any such line causes the processor to interrupt its current execution of a program (after saving stack registers and the like) and under hardware control to jump to an entry in a predefined interrupt vector table, the entry being determined by the particular interrupt line being activated. The interrupt vector table points to an address of an interrupt service routine, ISR, which the processor then executes. Upon completion of the ISR, the processor returns to the interrupted task. The hardware interrupt eliminates the need for the processor to poll input and output lines as part of the control program and thereby provides better use of processor resources and avoids the inherent delay caused by the intermittent nature of the polling process.

A second respect in which embedded operating system differ from general purpose operating systems is that the hardware configuration and software used in conjunction with an embedded operating system can be far more varied than that encountered by of a typical computer operating system. Normally an embedded operating system is custom configured from a wide variety of different types of input/output modules and communication modules and will execute a unique control program written particularly for the hardware configuration and control application at hand. One important point of variability in the hardware that is controlled by the embedded operating system is the hardware needed for communication protocols, both standard computer communication protocols and specialized protocols used principally for industrial automation. Such protocols may include open communication protocol such as Ethernet, ProfiBus, FieldBus, FireWire and DeviceNet, and proprietary data networks such as the Data Highway series of communication protocols developed by the assignee of the present application. In order to accommodate this variety of different communication protocols and the predictable, high speed responses required of such protocols used for industrial control, the embedded operating system may be constructed in modular form to allow different communication hardware ("cards") to be interchanged by connection and disconnection on a common backplane.

An embedded operating systems ability to operate with a wide variety of data protocols cannot be easily matched by a standard embedded operating system. Such operating systems either prevent direct access by the user of the interrupt vector table or only allow access to the vector table at compile time. In a more general implementation of an embedded operating system the vector table is filled with addresses pointing to the operating system's interrupt "router" which handles all interrupts. This approach increases portability of the operating system between different processor types which may have different numbers of interrupt lines.

After the interrupts are directed to a single operating system router, they are forwarded to a limited number of ISR's (interrupt service routines) created by the user but loaded only at the time of generation of the operating system kernel. The user generated ISR's then poll the hardware devices to identify the particular device requiring service, and then reports this information back to the operating system which schedules an interrupt service "thread" including an appropriate software driver for later execution. The execution of the thread is according to the normal scheduling of tasks by the operating system and thus cannot be guaranteed to meet the response times required for high speed industrial control communication protocols. While the user generated ISR's can perform some handling of high speed communication tasks, the requirement that they be built in at the time of generation of the operating system kernel is unacceptable in an industrial control environment where hardware and thus ISR's must be changed in the field.

BRIEF SUMMARY OF THE INVENTION

The present inventor has recognized that the limitations of embedded operating systems in not allowing run time modification of interrupt service routines can be overcome by the technique of creating a "soft vectored" interrupt service routine at the time of generation of the operating system kernel and allowing the soft vectored interrupt service routine to redirect interrupts to "installable" interrupt service routines that are installed at a later time, for example, in the field. These installable interrupt service routines must be loaded so as to be accessible by the soft vectored interrupt service routines in the operating system space, and further after the installable interrupt service routines are loaded, the soft vectored interrupt service routine must be modified slightly to be able to identify the location of the installable interrupt service routines to forward interrupt requests. This is done by writing a loader function which, when invoked, loads the installable interrupt service routines and patches the soft vectors interrupt service routine with the address of the installable interrupt service routine. Potentially unlimited run-time modification to the interrupt service routines may thus be obtained while preserving, in addition, the ability to install drivers for less time critical aspects of the interrupt service that may be scheduled and loaded according to standard operating system protocol.

Specifically, then, the present invention provides a method of adapting an embedded operating system to allow the operating system to map real-time interrupt vectors to an operating system interrupt router which then activates an installed service routine which returns an indication of a device driver to be scheduled as a task for handling the interrupt. At the time that the operating system kernel is generated, the method includes the steps of generating an operating system accessible soft vector table and installing the soft vectored interrupt service routine which when executed interrogates the soft vector table to call a installable interrupt service routine indicated by the table. At run time, the method installs the installable interrupt service routine and loads the address of that installable interrupt service routine into the soft vector table.

Thus it is one object of the invention to provide for run time loading of interrupt service routines in a embedded operating system that normally requires interrupt service routines to be loaded at the time of generation of the operating system kernel.

It is another object of the invention to provide for an extremely high speed response to interrupts that allow such run time flexibility. In contrast, device drivers which are loadable at run time do not provide the reliable high speed response.

The method may include the additional steps of creating a loader function that executes to perform the run time steps described above and incorporating that into the operating system kernel to be invoked at run time.

Thus, it is another object of the invention to provide for the necessary connection of the soft vectored interrupt service routine and the installable interrupt service routines within the memory space of the kernel at run time. The ability to define a function allows this connection to be done.

The loader function may further load a device driver associated with the installable interrupt service routine and, execution of the installable interrupt service routine may identify the device driver to the operating system interrupt router on completion of execution of the installable interrupt service routine.

Thus it is another object of the invention to provide for the ability to use conventional drivers in addition to the installable interrupt service routines.

The installable interrupt service routine and the device driver may be contained in a single file supplied by the user and read by the loader function.

Thus, another object of the invention is to provide a convenient mechanism for adding interrupt service routines and device drivers as new hardware is added to an industrial controller. The file may be contained on a disk or downloaded from another system.

The foregoing and other objects and advantages of the invention will appear from the following description. In the description, reference is made to the accompanying drawings which form a part hereof and in which there is shown by way of illustration a preferred embodiment of the invention. Such embodiment does not necessary represent the full scope of the invention, however, and reference must be made to the claims herein for interpreting the scope of the invention.

DETAILED DESCRIPTION OF THE PREFERRED EMBODIMENT

Figure 1:
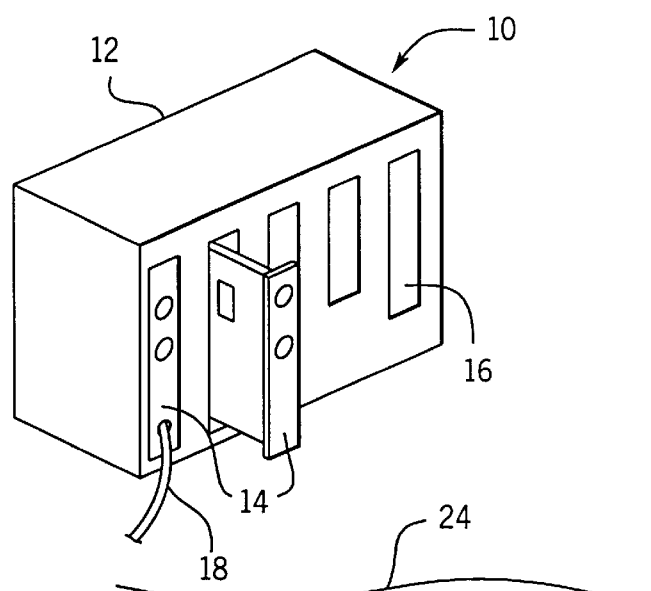
FIG. 1 is a simplified perspective view of a general industrial controller showing its modular construction in which different hardware cards may be added to or removed from a common backplane.

Referring now to FIG. 1, an industrial controller 10 includes a cabinet 12 having an internal backplane (not shown in FIG. 1) and receiving one or more hardware cards 14. The hardware cards may be connected to the backplane and disconnected from the backplane so as to allow reconfiguration of the fundamental hardware of the industrial controller. The hardware cards 14 may include those required for industrial and other communication protocols such as Ethernet, DeviceNet, ControlNet, and the Data Highway protocols as well as other commercially available protocols well-known in the art. Such communication protocols may require a reliable and high speed response to particular characters received over the conductors 18 in keeping with their use in industrial control. The hardware cards may connect via conductors 18 with other cards and/or with other controllers or with input or output points of an industrial process (also not shown).

Figures 2A, 2B:
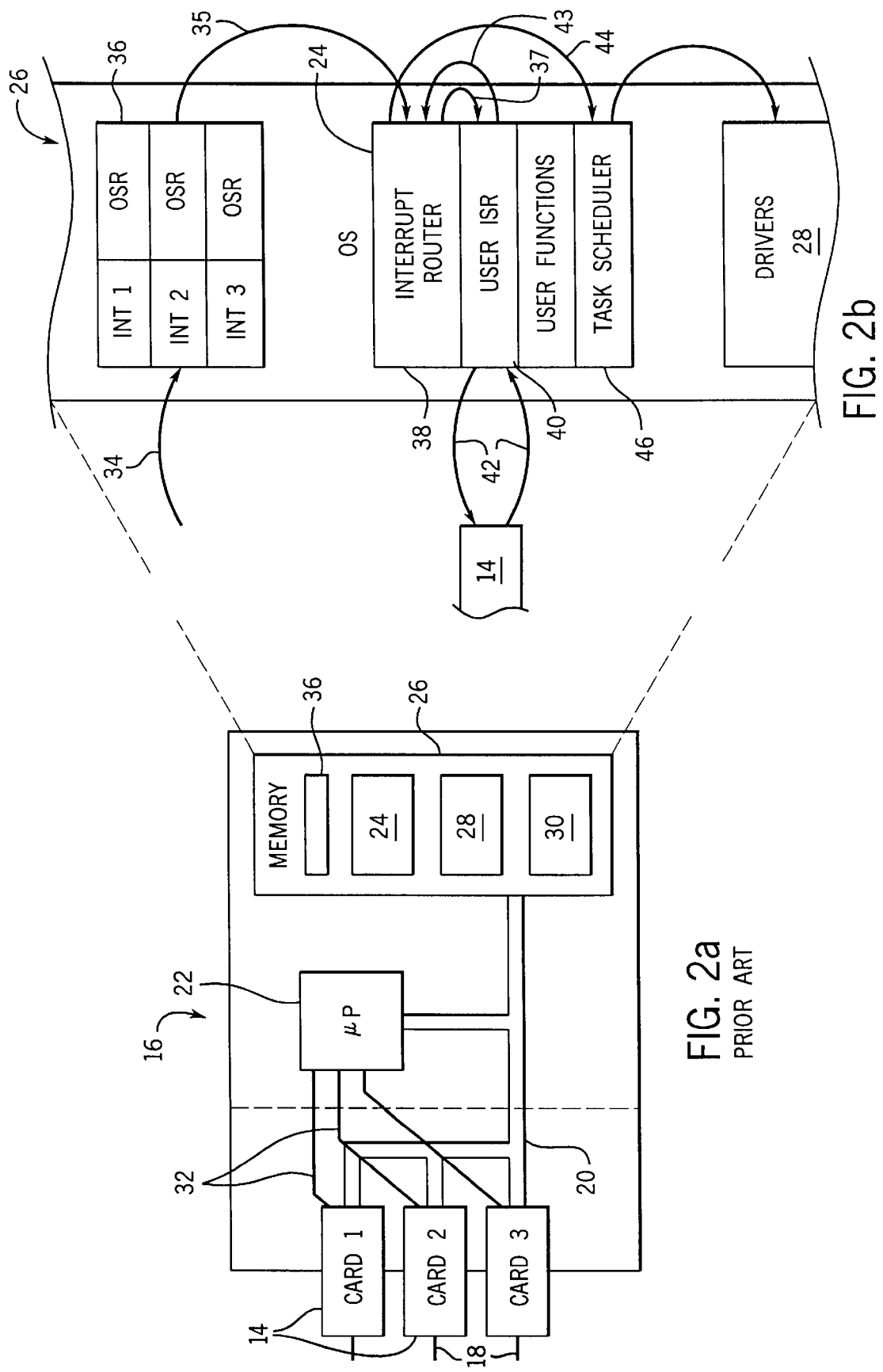
FIGS. 2a and 2b are schematic block diagrams of the prior art industrial controller of FIG. 1 showing the hardware cards in communication with the processor and its memory via a bus structure, including an expanded view of the memory holding an interrupt vector table, an operating system kernel including an interrupt router, one or more compiled interrupt service routines, one or more user defined operating system functions, a task scheduler, and drivers (not part of the kernel), showing intercommunication between these elements during the normal processing of servicing an interrupt.

Referring now to FIG. 2a each of the hardware cards 14 may communicate with a processor module 16 and its memory 26 via a common backplane 20. Interrupt lines 32 also communicate between hardware cards 14 and processor 22 allowing the hardware cards 14 to interrupt the processor 22 so as to attain immediate response to particular time-urgent requests.

Generally during operation, the processor 22 reads inputs obtained from the hardware cards 14 along backplane 20 and writes outputs to those hardware cards 14 along the same backplane 20. The control of the processor 22 is according to a user control program 30 executed under an operating system kernel 24 contained in memory 26. The application program 30 may include a control program written in relay ladder logic or the like, as is well-known in the art and compiled for execution on the processor 22. The operating system kernel 24 may be Windows CE or similar-type embedded operating systems commercially available from the Microsoft Company and others. Driver programs 28 include software particular to the hardware cards 14 to allow communication between the applications and the hardware cards 14 via the operating system kernel 24 according to conventions well-known in the art.

Also contained in memory is hardware interrupt vector table 36 as well as general I/O storage in an I/O image table (not shown).

Referring now also to FIG. 2b, the processing of an interrupt conventionally requires communication between a number of elements of the operating system as will be indicated by arrows showing paths of execution of that processing between the software elements.

According to hardware designs well known in the art, the occurrence of an interrupt on interrupt line 32 causes the processor 22 to interrogate a pre-determined address cluster known as the interrupt vector table 36 as indicated by arrow 34. In accordance with the requirements of the operating system 24, each interrupt vector intended normally to point to different interrupt service routines is loaded with the address of an operating system interrupt router 38 through which all interrupts must pass. By multiply loading the interrupt vector table 36 with the address of the operating system interrupt router 38, the operating system may be designed for a variety of different processors having different numbers of interrupts. On the other hand, the identification of the particular interrupt is lost in this process. In any case, all interrupts cause the calling of the operating system interrupt router 38 per arrow 35.

For this reason, the operating system interrupt router 38 may then call a compiled interrupt service routine 40 (per arrow 37) which polls the hardware cards 14 indicated by arrows 42 to identify the particular hardware cards 14 requiring service. The compiled interrupt service routine 40 must be fixed at time of generation to the operating system kernel and cannot be easily replaced after the kernel is prepared and embedded in the industrial controller 10.

The compiled interrupt service routine 40, after being called by the operating system interrupt router 38, may respond to particular short-term requirements of the hardware cards 14, and then terminate after responding to the operating system interrupt router 38 with the identity of the hardware card 14 causing the interrupt, as indicated by arrow 43.

The operating system interrupt router 38 then passes information, indicated by arrow 44, to a task scheduler 46 of the operating system 24 which schedules as an interrupt service thread, in the normal multi-tasking environment of the operating system, a particular driver 28 for execution for handling the remainder of the requirements of the hardware cards 14 causing the interrupt.

Generally, the drivers 28 cannot communicate directly with the address space of the operating system kernel 24 to modify variables or to read information therefrom and cannot directly access the interrupts through the interrupt vector table 36. Nevertheless, the drivers 28 may be readily loaded at run time through means of standard functions of the operating system kernel 24.

Figure 3:
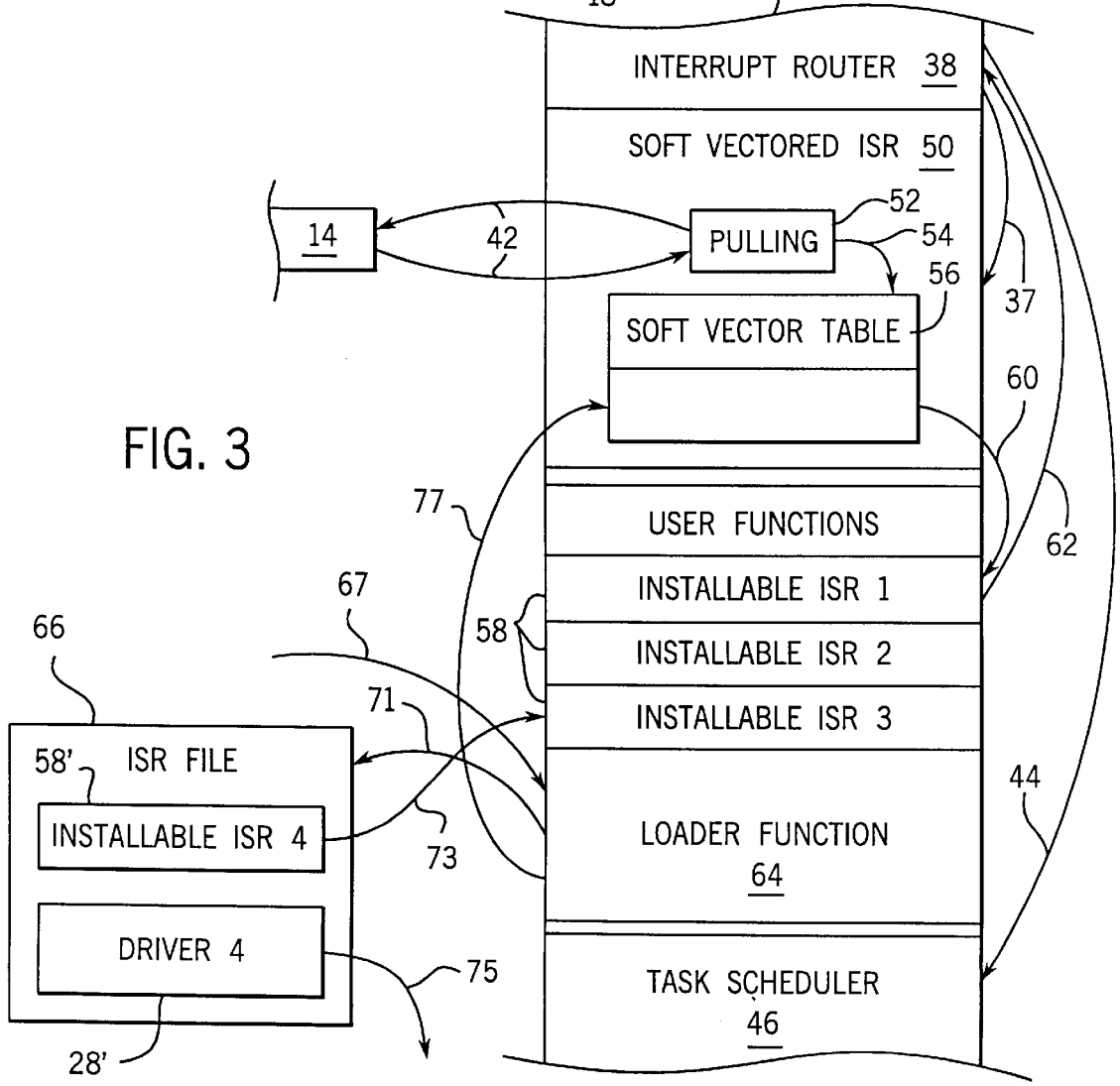
FIG. 3 is an expanded fragmentary view of the operating system of FIG. 2 as modified by the present invention showing the replacement of the compiled interrupt service routines with a soft vectored interrupt service routine which may direct interrupts to installable interrupt service routines as installed at run time by a loader function and showing communication of these elements during service of an interrupt and showing use of the loader function to load a composite driver file that contains the installable interrupt service routine and the driver code that is executed outside of the interrupt per the present invention.
Figures 4, 5:
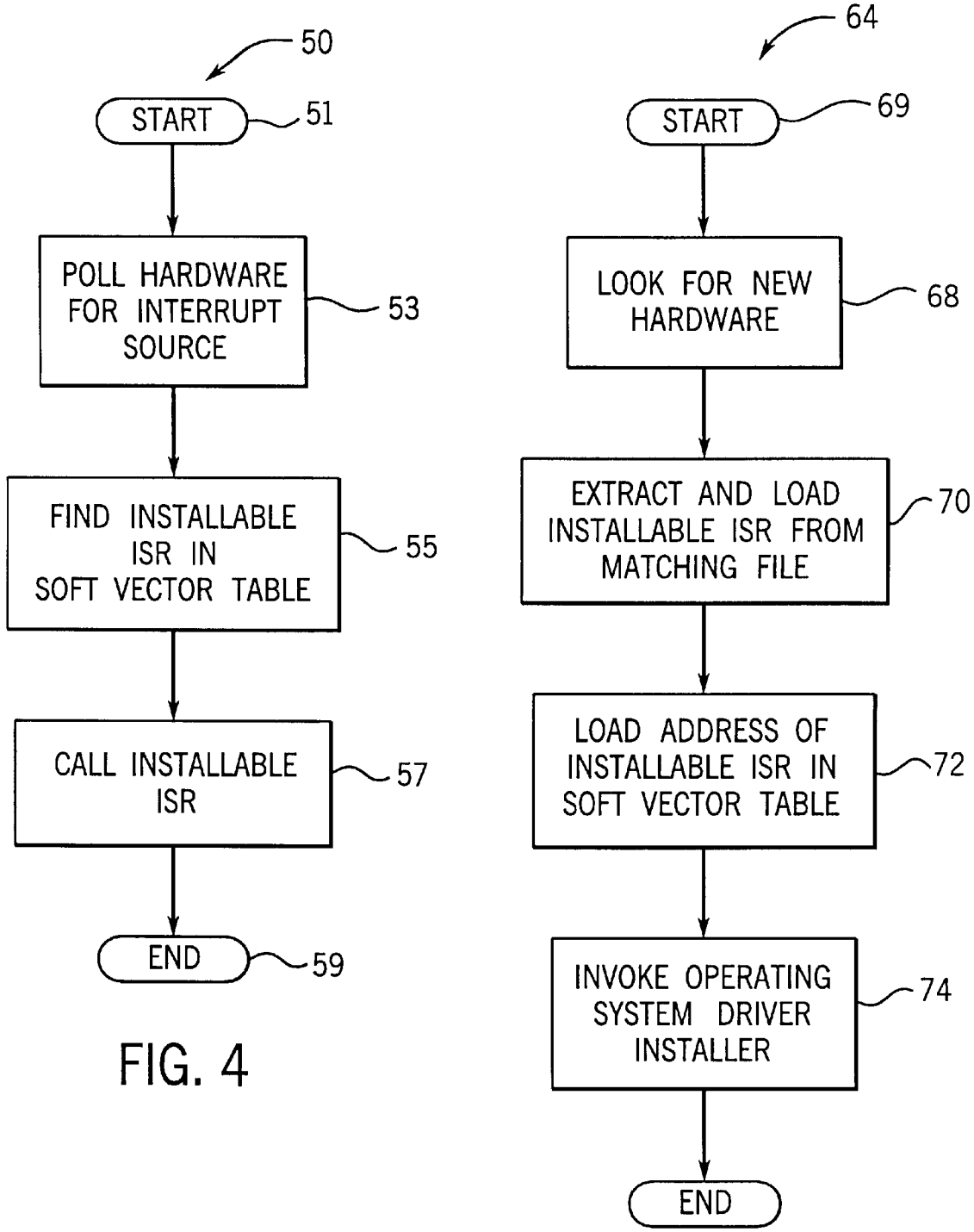
FIG. 4 is a flowchart showing the steps of operation of the soft vectored interrupt service routine of the present invention and of FIG. 3.
FIG. 5 is a flowchart similar to that of FIG. 4 showing steps of operation of the loader function of FIG. 3.

Referring now to FIGS. 3 and 4, the present invention replaces the compiled interrupt service routines 40 (which cannot be modified at run time) with a soft vectored interrupt service routine 50, which also cannot be modified at run time but which redirects interrupts to installable interrupt routines 58 which can be modified at run time. . Like the interrupt service routine 40, the soft vectored interrupt service routine 50 receives calls from the operating system interrupt router 38 indicated by arrow 37, (and process block 51 of FIG. 4) and like the compiled interrupt service routine 40, the soft vectored interrupt service routine 50 includes a polling section 52 which polls via arrows 42 hardware cards 14 to determine the source of the interrupt (per process block 53 of FIG. 4). However, no processing of the interrupt is normally handled by the soft vectored interrupt service routine although, in theory, common elements of all interrupt service routines might be so handled. Instead the polling section 52 takes the information about the source of the interrupt indicated by arrow 54 and uses it to query a soft vector table 56 (per process block 55 of FIG. 4) to obtain the identity of a installable interrupt service routine 58 that was previously stored within the address space of the operating system kernel 24 by a loader function 64.

These installable interrupt service routines 58 may be arbitrarily located within the memory space of the operating system kernel 24 because there need be no direct communication between the operating system interrupt router 38 and the installable interrupt service routines 58 such as would require the interrupt service routines 58 to be loaded at the time of generation of the kernel. All that is required is that some address space of the operating system kernel 24 address space be preserved for the loading of the installable interrupt service routines 58 at a later time as will be described.

Once the soft vector interrupt service routine 50 has looked up one of the installable interrupt service routines 58 in the soft vector table 56, that installable interrupt service routine 58 is invoked as indicated by arrow 60 (and process block 57 of FIG. 4). The installable interrupt service routine 58 so invoked executes on an extremely fast and predictable basis necessary functions that are required by the hardware cards 14.

At conclusion, the installable interrupt service routine 58 returns to the operating system interrupt router 38, in the manner that would be done by the interrupt service routine 40, an identity of the hardware card 14 and/or a device driver 28 whose execution will be scheduled as an interrupt service thread by task scheduler 46 as described above. The returning of the identity of the device driver 28 is indicated by arrow 62 and the scheduling of the device driver as an interrupt service thread is indicated by arrow 44 (both as also indicated by process block 59).

The driver program 28 may accomplish non-time critical functions incident to the servicing of the interrupt. This dual level response using the soft vector interrupt service routine 50 and the installable interrupt service routines 58 thus accomplishes much of the same as could be done with the interrupt service routine 40 alone. However, as will now be described, the installable interrupt service routines, freed from direct communication with the operating system interrupt router 38, may be loaded at run time, providing great flexibility to the changing of the hardware configuration of the industrial controller 10.

As noted above, normally application programs 30 and driver programs 28 do not have access to the memory space of the operating system kernel 24. Accordingly, the loading of the installable interrupt service routines 58 and their entry into soft vector table 56 must be accomplished by the operating system itself. In practice, this may be done by preparing a loader function 64 for incorporation into the operating system kernel at the time of generation of the operating system kernel. Such defined functions are allowed in embedded operating systems.

Referring still to FIG. 3, the loader function 64 works with a composite driver file 66 which includes a installable interrupt service routine 58' and a driver 28' associated with particular hardware cards 14. Such file 66 may be stored on a disk to be included with the hardware card 14' and to be communicated with the industrial controller 10 via communication link along conductors 18 or by other techniques well known to the art.

Referring now also to FIG. 5, during run time, the loader function 64 may be invoked as indicated by process block 69. This invocation may be a function call to the operating system as is allowed by the operating system under conventional operating system protocols. When invoked, the loader function 64 may look for new hardware cards 14 as indicated by process block 68 through a polling process similar to that used by the polling section 52 according to conventions that may be established by the card manufacturers and the manufacturer of the industrial controller 10. Alternatively, the invocation of the loader function 64 may include command line data indicating new hardware for which loading must be accomplished, for example, by indicating a file 66. The invocation of the defined loader is indicated by arrow 67.

At process block 70, file 66 is located (per arrow 71) and the installable interrupt service routine 58 is extracted and loaded into the operating system memory space as indicated by arrow 73. This loading may be by the loader function 64. At succeeding process block 72, the address of the now-loaded installable interrupt service routine 58' is determined and that address written into the soft vector table 56 at a column of the table corresponding to the particular device as may be identified by the polling block in subsequent run time operation. This is indicated by arrow 77 in FIG. 3. Finally, at process block 74 the defined loader installs a corresponding device driver 28, if any, into the driver segment of the memory 26 as indicated by arrow 75.

It will be understood that although the number of installable interrupt service routines 58 are limited to those which may be placed in the operating system kernel (potentially an unlimited space), the ability to change the installable interrupt service routines 58 during run time allows for complete flexibility in reconfiguration of the industrial controller 10, and thus, provides a substantially greater number of options for interrupt service routines than would be provided if all interrupt service routines needed to be loaded during the time of generation of the operating system kernel 24.

The above description has been that of a preferred embodiment of the present invention, it will occur to those that practice the art that many modifications may be made without departing from the spirit and scope of the invention. For example, the present invention is not limited to use with embedded operating systems but may be used for the generation of an entirely new operating system intended for embedded controllers, thus obtaining the advantages of hardware indifference caused by a collection of all interrupt service routines through a common operating system interrupt router while allowing for real-time modification of the interrupt service routines which may be used in conjunction with drivers executing according to regularly scheduled interrupt service threads. In order to apprise the public of the various embodiments that may fall within the scope of the invention, the following claims are made.

I claim:

1. A method of adapting an embedded operating system mapping real-time interrupt vectors to an operating system interrupt router, the interrupt router activating a compiled interrupt service routine so as to then receive from the compiled interrupt service routine, an indication of device driver to be scheduled for handling the interrupt, the method comprising the steps of:
   (a) at a time of generating the operating system kernel:
      (1) generating an operating system accessible soft vector table;
      (2) installing a soft vector interrupt service routine executing to interrogate the soft vector table to call an installable interrupt service routine indicated therein;
   (b) at a run time;
      (1) installing at least one operating system accessible installable interrupt service routine;
      (2) loading an address of the installable interrupt service routine in the soft vector table;
   whereby installable interrupt service routines suitable for real-time control may be added at run time after creation of the embedded operating system kernel.

2. The method of claim 1 further including the steps of: creating an loader function executing to perform steps (b)(1) and (b)(2);
   at the time of generating the operating system kernel, incorporating the loader function into the kernel; and
   at the run time, invoking the loader function.

3. The method of claim 2 wherein the loader function, when invoked, further loads a device driver associated with the installable interrupt service routine and wherein the installable interrupt service routine identifies the device driver to the operating system interrupt router upon completion of execution of the installable interrupt service routine.

4. The method of claim 3 wherein the installable interrupt service routine and the device driver are contained in a single file and read by the loader function.

5. The method of claim 3 wherein the loader function further interrogates hardware attached to a computer on which the operating system is running to identify the appropriate installable interrupt service routine and device driver for loading.

6. The method of claim 1 wherein the address of the installable interrupt service routine loaded in the soft vector table is a physical address of a starting memory location of the installable interrupt service routine.

7. The method of claim 1 wherein the embedded operating system maps all realtime interrupt vectors to a single operating system interrupt router.

8. The method of claim 1 wherein the installable interrupt service routine provides a response to communications generated interrupts.

9. An operating system suitable for real-time control for use on a computer responding to interrupts by reading an interrupt vector table and executing a routine pointed to by a vector of that table, the operating system comprising:
   (a) an operating system interrupt router, identified in the vector table to execute upon an interrupt to invoke an interrupt service routine and to receive from the invoked interrupt service routine an identification of a device driver to be scheduled for handling the interrupt;
   (b) a soft vector interrupt service routine invoked by the operating system interrupt router to interrogate the soft vector table to call a routine indicated therein;
   (c) a soft vector table; and
   (d) a loader function executing to load an installable interrupt service routine executing to handle an interrupt by a hardware device and to load an address of the installable interrupt service routine into the soft vector table;
   whereby execution of the soft vector interrupt service routine may invoke the is installable interrupt service routine.

10. The operating system of claim 9 wherein the loader function, when invoked, further loads a device driver associated with the installable interrupt service routine and wherein the installable interrupt service routine identifies the device driver to the operating system interrupt router upon completion of execution of the installable interrupt service routine.

11. The operating system of claim 10 wherein the loader function extracts the installable interrupt service routine and the device driver from a single file and read by the loader function.

12. The operating system of claim 10 wherein the loader function further interrogates hardware attached to a computer on which the operating system is running to identify the appropriate installable interrupt service routine and device driver for loading.

13. The operating system of claim 9 wherein the loader function places a physical address of a starting memory location of the installable interrupt service routine in the soft vector table.

* * * * *